US008655671B2

(12) United States Patent
Morris

(10) Patent No.: US 8,655,671 B2
(45) Date of Patent: Feb. 18, 2014

(54) INTERNET BASED RELEASE TRACKING SYSTEM

(75) Inventor: Daniel R. Morris, Virginia Beach, VA (US)

(73) Assignee: reQuire, LLC, Virginia Beach, VA (US)

( * ) Notice: Subject to any disclaimer, the term of this patent is extended or adjusted under 35 U.S.C. 154(b) by 3090 days.

(21) Appl. No.: 10/308,268

(22) Filed: Dec. 4, 2002

(65) Prior Publication Data
US 2004/0024605 A1 Feb. 5, 2004

Related U.S. Application Data

(60) Provisional application No. 60/399,372, filed on Jul. 30, 2002.

(51) Int. Cl.
*G06Q 10/00* (2012.01)

(52) U.S. Cl.
USPC ............................. 705/1.1; 705/311; 705/313

(58) Field of Classification Search
USPC ...................................... 705/1, 313, 1.1, 311
See application file for complete search history.

(56) References Cited

U.S. PATENT DOCUMENTS

| | | | | |
|---|---|---|---|---|
| 2002/0049624 A1* | 4/2002 | Raveis, Jr. | ........................ | 705/8 |
| 2002/0107703 A1 | 8/2002 | Feinberg et al. | | |
| 2003/0050891 A1* | 3/2003 | Cohen | ............................ | 705/42 |

OTHER PUBLICATIONS

Stewart Title Company, Electronic Forms Library, verified via Wayback Machine—Aug. 15, 2000, p. 1.*

Lew Sichelman, "Don't Get Burned—There's more to Paying off a Loan Than Mailing in the Final Payment", The San Diego Union—Tribune, Sep. 3, 2000, p. 1.1.*
MERSCORP, Inc., Procedures Manual, Version 10.0, Nov. 18, 2002, pp. 89-90, U.S.
MERSCORP, Inc., Rules of Membership, Jul. 2006, pp. 13-14, U.S.
MortgageServ, Total Mortgage Servicing from fs, Spring 2001 User Conference.
MERS aids electronic mortgage program; Mortgage Electronic Registration Systems In.; Cover Story, Mortgage Bankers Association of America, Jan. 1997, No. 4, vol. 57; p. 42.
MERS® Integration Handbook, vol. II, Version 11.0, May 19, 2002.
For mortgages—MERS emerges, Banker's Research, Feb. 1997.

* cited by examiner

*Primary Examiner* — Carrie Gilkey
(74) *Attorney, Agent, or Firm* — Williams Mullen, PC; Thomas F. Bergert

(57) ABSTRACT

An Internet based real estate transaction and release tracking system that insures deeds of trust, liens and other encumbrances are released in a timely manner after the lien holder has received payment for the underlying obligation. Based on information provided by an agent, such as an escrow agent or a settlement agent, the system creates a unique electronic record for each real estate transaction entered by the agent. The system receives update information, either automatically from other computers or via manual input from searchers, and uses this update information to track each real estate transaction. The system monitors the records and indicates when a lien holder has failed to release their lien after a statutory time period that begins after the passing of the settlement date. When the statutory time period has passed, the system generates a number of forms, including a demand letter. The demand letter is sent to the lien holder demanding them to release the lien. If the lien is not thereafter released, further legal documents can be generated and sent to a law firm for legal action to be taken against the delinquent lien holder.

20 Claims, 8 Drawing Sheets

INTERNET BASED RELEASE TRACKING SYSTEM

The invention described herein was originally filed as a provisional patent application on Jul. 30, 2002, application No. 60/399,372, and priority is hereby claimed to that provisional application.

BACKGROUND OF THE INVENTION

The present invention relates generally to the fields of real estate finance and information transfer, and more specifically to a system for ensuring that liens securing real property (e.g. deeds of trust) are released in a timely fashion after the obligation underlying the lien (e.g. the note) is fully or partially paid or satisfied following payoff.

There are two common types of real estate transactions utilizing lender financing: the sale; and the refinance. Both forms involve commitment from a lender to provide funds to borrowers necessary for the purchase or refinance the property. Both require establishment of certain rights (depending on jurisdiction) in the property for the benefit of the lender to secure the repayment of the loan. In a sale, the "Buyer" applies to a lender for funds to pay to the seller for the transfer of the title of real property. In a refinance an owner or "Borrower" applies to a lender for funds to replace or "payoff" a prior loan secured by real property. Assuming the loan is approved, in both transaction types, the Lender establishes a security interest or equitable right in the real property concurrently with the borrower/buyer that allows the lender to sell the property in the event of default and apply the proceeds to the balance of the defaulted Note.

To establish the security interest, the Lender requires the Borrower/Buyer to execute legal documents establishing this equitable interest or lien on the property. This lien document is then indexed and published in the public land record system of the particular city or county wherein the property is situated. The publication provides notice to the public that the lender holds a lien or security interest in the property. In the majority of jurisdictions, priority of the lien is of utmost importance. Priority is establish by the date of recording. A lien recorded prior in time to a second lien will have priority—that is the beneficiary of the lien with priority (the old lender for this discussion) will have the right to exercise certain rights inherent in the lien to the detriment of any lien holder later in time (the new lender). The priority status is sometimes referred to in the industry as "first in time first in right". Hence, during the closing of the real estate transaction, measures are taken to establish the priority of the security interest of a lender providing funds to the transaction, over that of prior lien holders.

Lenders, for purposes of this application, shall be synonymous with Lien creditors. Notes and other contracts providing evidence of debt are generally used to describe the underlying obligations secured by the lien. Liens in this application shall include, without limitation, Deeds of Trust, Mortgages, Deeds to Secure Debt, etc. Settlement date for purposes of this application shall include without limitation date of disbursement, date of notice of payoff payment to old lender or date of escrow settlement. Such date or notice varies depending on jurisdiction.

In a typical real estate transaction the Settlement Agent or Escrow Agent orders an evaluation of the public record to establish the existing liens on the real property subject to the upcoming transaction. Such evaluation is in most cases based on an examination of the indexed records in the courthouse having jurisdiction of the physical location of the property. Title Searchers or Abstractors examine the records and report the legal title status to the Settlement Agent. This "Title Report" includes, among other data, the current owner, and current liens and encumbrances or claims of record on the property There are many varieties of liens that may attach to title of real property. Although the embodiment of the subject invention applies to many types of liens, the lien that will be used for discussion purposes involves liens established by the owners of real property conveying a security interest to lenders in return for lender's payment of money to the buyer/owner for either the purchase of the property or the refinance of the real property. These liens are commonly called, Deeds of Trust, Deeds to Secure Debt, Mortgages, etc.

The borrower, title insurance underwriter, and/or new lender provides contracts and instructions to the Settlement Agent to payoff existing notes and satisfy or remove their liens in order to establish the proper priority of a new lien on the property. Usually a title company underwriter reviews the title report and enumerates certain requirements in a Title Binder to bind title insurance coverage for the benefit of the new lender. This title coverage protects the security interest of the new lender established by the new lien instrument. It is therefore important for both the lender and title insurance company that the prior liens be properly released or re-conveyed following closing of the new loan.

In a typical closing, the Settlement Agent collects funds from the new lender and various parties and disburses them pursuant to the terms of the settlement documents. One particular disbursement—the Payoff—is critical to the establishment of the new lender's priority security interest in the real property. The term "payoff" refers to the funds designated to satisfy the note or notes underlying existing lien(s) on the real property.

This payment tendered by the Settlement Agent satisfies the note. However, in most cases the Settlement Agent does not have the authority to release the lien on behalf of the old lender. The old lender holding the note typically has a legal obligation to "release" or "re-convey" the lien within a statutory time period. As part of their duties under the escrow terms, the Settlement Agent must then keep its file open for some time after the closing to search the Court records to determine whether the old lender compiled with their legal duty to release or re-convey the lien on the real property. In most states the Settlement Agent cannot release or reconvey the lien despite their assurance that the old lender accepted and deposited the payoff disbursement funds.

On average, up to thirty percent of real property liens with fully satisfied underlying notes are not released within the statutory period. When this delay occurs, it causes many undue problems and risks for the new lender, the settlement agent, the title insurance company, the seller, the borrower (in a refinance), and the buyer (in a sale). Most States have enacted laws to motivate the old lenders to comply with their duty to release or re-convey the lien after the note they hold or service has been paid and satisfied. Typically, there is a first statute that sets a time period within which sellers must release the Deed of Trust (lien) after closing. A second statute then imposes a fine, penalty or forfeiture on lenders that fail to release or re-convey the Deed (lien) within the statutory time period.

While some governmental storage repositories, such as county courthouses, still store records "the old fashioned way", on paper documents bound in books, many more such repositories are now storing land conveyance records and indexes in electronic form. An "electronic index" stores all of the descriptive information regarding a specific real estate transaction that a traditional paper record stored on one or more pieces of papers. Typically an electronic index will have one or more fields wherein each field stores a different piece of information, such as settlement date, seller's name, etc., pertinent to the real estate transaction. Each field in an electronic index is typically assigned an attribute, which describes the type of information stored in the field. The term attributes is also commonly used to describe the features or details that are stored in an electronic index. All electronic storage sites and storage repositories have at least one system administrator that monitors the system and aids in performance of the system's overall purpose.

Settlement Agents typically use electronic systems or computer programs to collect and manage information relevant to the settlement process ("Settlement Programs"). There is a trend in the real estate transaction settlement industry to utilize such Settlement Programs to carry out the various duties of the Settlement Agent in its role as escrow agent or the title agent in a real estate transaction closing.

A release tracking system that could tap into such Settlement Programs and the many electronic storage repositories across a state, or the country, could benefit the new lenders providing loans secured by real property, the title insurance companies writing insurance policies on real property and owners/buyers of real property. Monitoring the actions of old lenders under a legal duty to release of re-convey liens and notifying lenders that they are out of compliance, such a system would invoke remedial measures established in particular states thereby enforcing the laws enacted to protect those holders of interest in real property. Such a system would take advantage of the Internet to dramatically decrease the amount of time and money Settlement Agents expend to verify and enforce the release or re-conveyance requirements. Such a system would also provide the following advantages: decrease the risk incurred by Title Insurance Companies insuring priority of new lender's security interests on real property; reduce the cost of release and re-conveyance that old lenders incur to navigate the dynamic requirements of each State to effectuate the release or re-conveyance; and ensure owners that satisfied liens will not encumber the title of their real property.

The existence and popularity of the Internet stems from the fact that hundreds of thousands of separate computer operators and computer networks independently use common data transfer protocols to exchange information. There is no centralized storage location or communication channel for the Internet. The explosive growth in popularity of the Internet is in large part based on the unrestricted communication medium it provides. The Internet has created a very low cost forum in which people can easily publish information and gain access to other desired information. Many computers access the Internet through a device called modem. A modem, which stands for modulator-demodulator, is a device that connects a computer to a telephone line or cable and allows information to be transmitted to or received from another computer or server. Information that is sent over a telephone line is converted by the modem into an audio signal, which is then transmitted by telephone lines to the receiving modem, which converts the signal into information that the receiving computer can understand. Of course connections to the Internet, that do not include telephone lines, are also frequently used. Computers with an all digital connection to the Internet typically use a device called a network card to transmit and receive information. Handshaking is the term used for signal acknowledging, between two computers, that communication or the transfer of information can take place. Handshaking may either be controlled by hardware or software.

The Internet is based on the concept of a client-server relationship between computers, also called a client/server architecture. To access information on the Internet, a user must first log on, or connect, to the client computer's host network. This connection can be established with or without user intervention depending on the software. Once a connection has been established, the user may request information from a remote server. If the information requested by the user resides on one of the computers on the host network, that information is quickly retrieved and sent to the user's terminal. If the information requested by the user is on a server that does not belong to the host LAN, then the host network connects to other networks until it makes a connection with the network containing the requested server. In the process of connecting to other networks, the host may need to access a router, a device that determines the best connection path between networks and helps networks to make connections. Once the client computer makes a connection with the server containing the requested information, the server sends the information to the client in the form of a file. A special computer program called a browser enables the user to view the file. Examples of Internet browsers are Mosaic, Netscape, and Internet Explorer. Non-multimedia documents do not need browsers to view their text-only contents and many multimedia documents provide access to text-only versions of their files. The process of retrieving files from a remote server to the user's terminal is called downloading. The process of transferring files to a remote server is called uploading.

SUMMARY OF THE INVENTION

A system for collecting, from various sources, information related to a real estate secured financial transaction, tracking the financial transaction, and ensuring that each lien securing the real estate, including deeds of trust, mortgages and deeds to secure debt, is released in a timely fashion after an obligation underlying a lien has been satisfied. The system comprises at least one server that stores and executes multiple programs, including a subscriber management program that prompts an agent that is involved in the real estate secured financial transaction for required and optional transaction data and financial data, and creates a subscriber profile for the agent. An order and invoice program creates an invoice for the settlement agent, verifies payment and upon verification the system, creates a transaction record based on the transaction data. A real estate forms program generates one or more forms customized to the agent and the real estate secured financial transaction, and transmits printable embodiments of the forms to the agent. A search management program assigns transaction records that must be tracked by manual searching to a searcher, provides an interface for the searcher to input search results, initiates a review of search results, and authorizes payment to searchers. The search management program can also receive and update information directly from other computers transaction records that can be searched electronically. A tracking program receives the search results and update information from the search management program and tests specified fields of transaction records to see if lien holders, that have had the obligation underlying their lien satisfied, have failed to release their lien on the real estate within the time period allowed by law. If the tracking program finds that a lien holder has failed to timely release their lien then the program sends out one or more notifications to another program, a system administrator or to a law office.

A transaction record can include more than one lien and in such situations the tracking program creates a lien record for each lien and tracks a status of each lien. A legal forms program is also provided and, upon receipt of a notification from the tracking program, or a system administrator, the legal forms program generates one or more customized legal forms pertaining to the real estate secured financial transaction and transmits printable embodiments of the legal forms to a law office or another system administrator. The one or more real estate forms that are provided to the agent include payoff letters, invoices, demand letters, certificates of satisfaction, release instruments, fax cover sheets, shipping labels, and transaction reports, wherein the transaction reports include, lien information, obligor information, settlement information, pay-off information and loan information. The legal forms program includes legal form templates for multiple jurisdictions that are used to generate the one or more customized legal forms, and the legal forms include release instruments, demand letters, cover letters, certificates of satisfaction, complaints and summons. The present tracking system is preferably accessed by searchers and other computers via the Internet, and the real estate forms and legal forms are transmitted from the system over the Internet. Each transaction record includes multiple fields and multiple attributes, and a settlement date for the payoff date is assigned to at least one field in each record.

The search management program may include multiple protocols and data mining programs that are used to interact with, and receive the update information from, the other computers. The search management program can also receive manual search results at any time from the searchers. The subscriber profile that is created by the subscriber management program is used by the real estate forms program and the legal forms program when generating forms. The system may also comprise at least two servers that are used to store and execute the programs, wherein the subscriber management program and the order and invoice program are stored and executed on the first server and the tracking program and the transaction records are stored on the second server.

It is an object of the present invention to provide a system for easy maintenance of release tracking at any desired time interval.

It is a further object to provide a core release tracking database and a series of supplementary release tracking databases that contain report masks customized for the local legal systems.

It is another object to provide complete analysis for the liens based on record date and other temporal metrics.

It is still a further object to provide the ability to create an unlimited number of attribute lists to describe an item within the database.

It is still another object to provide data consumers with customized views of the release tracking data.

It is still another object to provide data consumers with the framework for a data clearinghouse for tracking and managing data related to the process of closing loans and transactions secured by real estate.

BRIEF DESCRIPTION OF THE DRAWINGS

The invention of the present application will now be described in more detail with reference to the accompanying drawings, given only by way of example, in which.

DETAILED DESCRIPTION OF THE INVENTION

Figure 1:
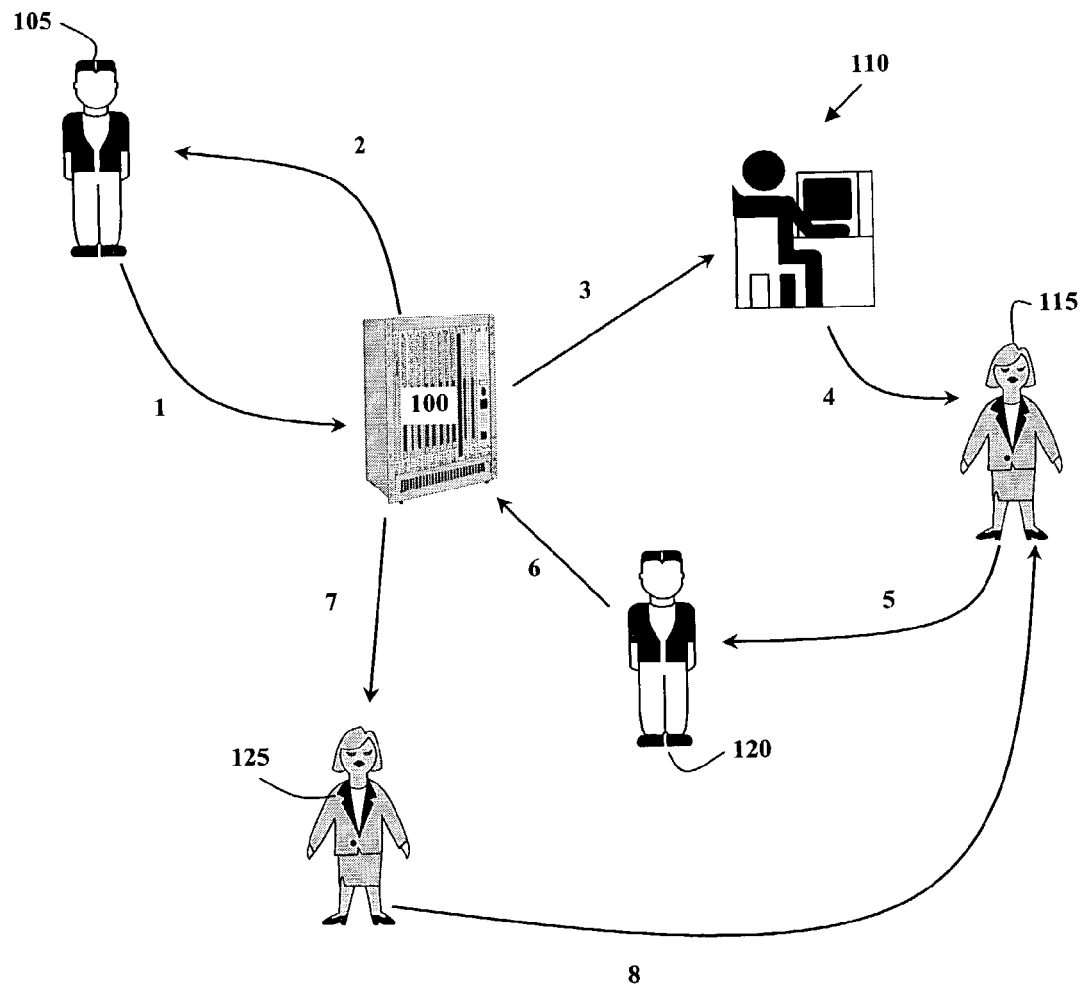
FIG. 1 is an exemplary schematic diagram of the preferred embodiment.

Referring to FIG. 1, the present release tracking system comprises one or more servers 100 that receive, store and track information relating to multiple real estate transactions in multiple jurisdictions. Server 100 also stores real estate transaction form masks, based on locally approved transaction forms, and can generate real estate transaction forms for an agent involved in the transaction, such as an escrow agent or a settlement agent 105. In the first exemplary exchange, represented by arrows with single digit reference numbers in FIG. 1, the agent 105 provides financial data, to subscribe to an exemplary real estate service, and transaction data relating to one or more transactions involving real estate, to server 100. Interface programs of the present system verify portions of the agent's input and forwards the transaction data to other portions of the present system, including the real estate forms program. In exchange 2, the agent receives multiple documents that have been customized for the agent based on the transaction data that was entered into server 100. In the third exchange, a record is created for each transaction and a system administrator 110 is notified of the existence of a new record. The administrator 110 examines all new records for completeness and, upon verification, determines whether or not the record can be tracked electronically. If electronic tracking of the real estate transaction is possible the administrator 110 initiates electronic tracking. If the record cannot be tracked electronically, in exchange 4, the administrator 110 assigns the record to a search manager 115. In exchange 5, the search manager 115 assigns the record to a searcher 120. After conducting manual searches through pertinent files, searcher 120 provides his search results to server 100 in exchange 6. In step 7, all search results are reviewed by quality assurance personnel 125 and/or quality assurance programs. Finally, in step 8, the quality assurance personnel send approvals or requests for corrections to the search manager 115.

Real estate transaction forms typically require that the same information, such as property description, seller's name and address, sales price and settlement date, be entered in multiple forms. The agent 105 is motivated to use the present system because the system allows for each piece of transaction information to be entered only once. Thereafter, software in server 100 enters each piece of transaction information in appropriate places in the real estate transaction forms. The software then transmits the forms to be printed locally at the agent's location. Thus, the agent saves time by having the server 100 fill out the required transaction forms and guarantees that the same information is present on each form, i.e., avoids the possibility repetition errors. Release tracking begins when an agent 105 accesses server 100 and enters information regarding a real estate transaction. Using the transaction information entered by the agent, server 100 creates a record for each lien to be released in the real estate transaction. All transaction records include a disbursement date representing the date on which the settlement agent sent funds to the old lender. The disbursement date is tracked by the present system to ensure that paid off liens are released within the time period set by state law.

Figure 2:
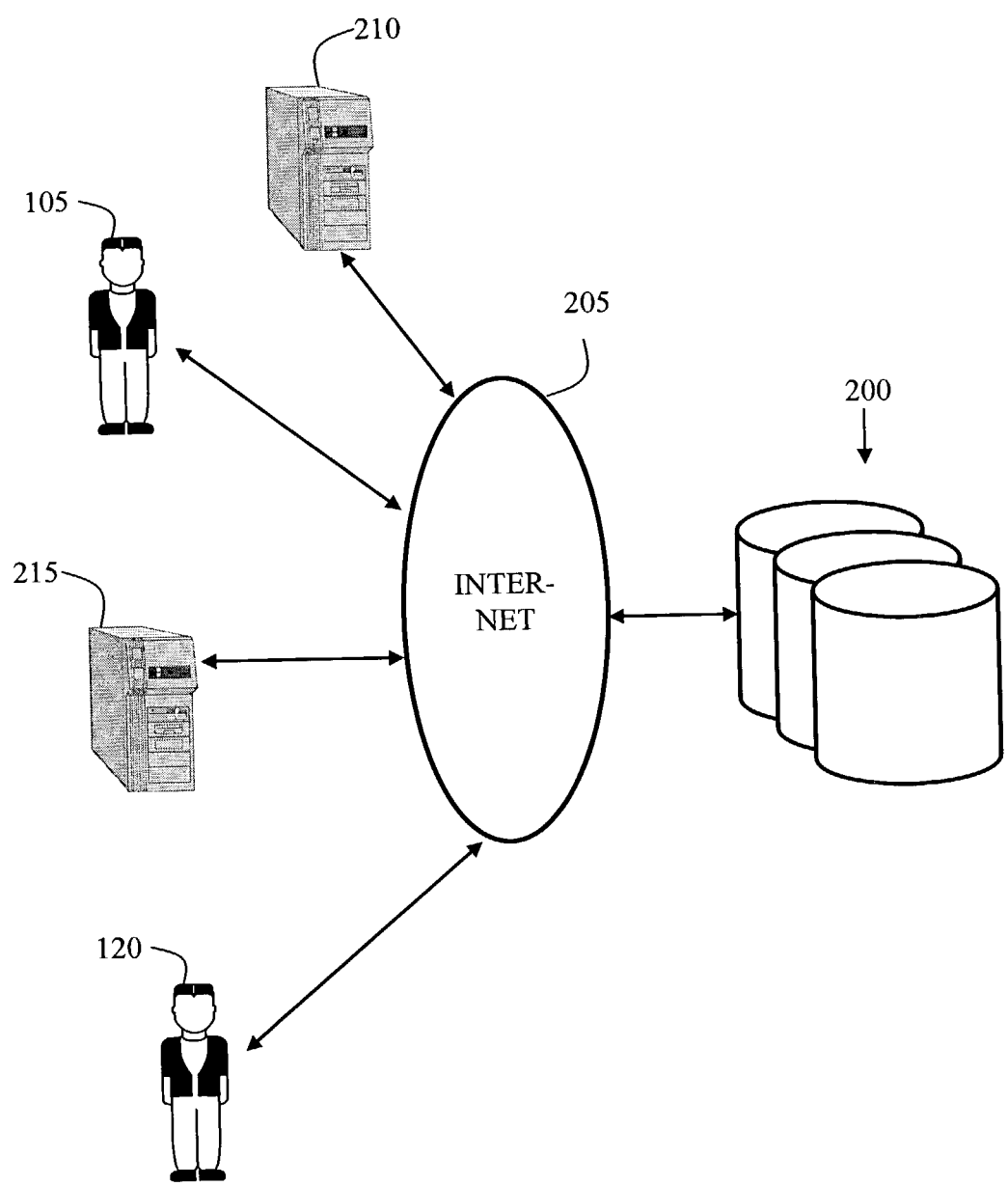
FIG. 2 shows exemplary communication channels for sending information to the present system.

Referring to FIG. 2, the present system includes at least one server that stores and executes multiple programs 200. The programs 200 include multiple user interface programs, such as a subscriber management program and an order placement and invoicing program. The programs 200 of the present system also include a title search management program, a real estate forms program, a tracking program, and a legal forms program.

The User Interface Programs

The user interface programs provide a graphical user interface for settlement agents 105. The user interface programs allow agents to manually enter current lien information and other transaction data, relating to one or more real estate transactions, into the present system. The user interface programs can also tap into existing data stored on the agent's own computer system 210 and allow data from computer system 210 to be uploaded directly to the present system.

Subscriber Management Program

The subscriber management program, another interface program collects the data from new subscribers, defines a profile for the subscriber, and sets parameters for other programs in the system that customize their actions. The subscriber management program insures that report generators conform to a subscriber's profile when generating documents. This program also sorts and filters subscriber's data, and provides messaging services for the subscriber and system managers (administrators).

Order Placement and Invoicing Program

The order placement and invoicing program, another interface program, generates input interfaces that are used to collect transaction data from subscribers. The order placement and invoicing program also generates the invoices for the subscribers and collects verification of payment data from various data entry interfaces. The payment data can be verified electronically, if paid by credit card for example, or with the assistance of an administrator, if payment is made through the mail. Upon verification, a transaction record is created for each real estate transaction, and the order placement and invoicing program releases the records to other programs in the present system.

Real Estate Forms Program

The real estate forms program receives the transaction data from the order placement and invoicing program and generates one or more real estate forms that are required by the agent 105. The real estate forms are then transmitted to the agent so that the agent can print the forms locally. The one or more real estate forms that are provided to the agent include, payoff letters, invoices, demand letters, certificates of satisfaction or release instruments, fax cover sheets, shipping labels, and transaction reports. The reports include, lien information, obligor information, settlement information, pay-off information and loan information.

Search Management Program

The search management program provides title searcher interfaces and search order and delivery programs to collect and manage search data. The program collects records that must be manually searched, matches the record with a subscribing searcher, assigns the search to the searcher accepting the order and tracks the efficiency and accuracy of searchers. A search return interface is provided to collect the results of the search—e.g. released or not released. The search management program also provides interfaces and applications to conduct automatic searches on various land record repositories incorporating electronic internet-based indexes. The program determines whether the search information is available electronically or whether to assign the search order to a search subscriber. The search management program also tracks payment to searchers for their searches performed.

Tracking Program

The tracking program also receives the transaction records from the order placement and invoicing program and creates an electronic lien record for each entity holding a lien, or other encumbrance, on the real estate that is the subject of the transaction. The system may track multiple liens associated with the real estate transaction, such as occurs when second and third mortgages are taken out on a house for example. At various times the tracking program receives update information, from the search management program, for each lien record and uses the update information to update information in specified fields of the lien records. Upon the occurrence of one or more specified events, the tracking program sends out one or more notifications.

Legal Forms Program

The legal forms program acts on notifications received from the tracking program. The legal forms program includes legal form masks, also called templates, for multiple jurisdictions that are used generate the legal forms, including release instruments, and demand letters. The release instrument or demand letter can be sent to a system administrator for subsequent mailing to the offending lien holder, or the form can be sent directing to the offending lien holder. If the lien is not released within the time specified in the demand letter, then the legal forms program will receive another notification from the tracking program, which will initiate the production of other legal forms that can be used to begin a civil action against the offending lien holder.

The present system can be designed to track any particular area of a real estate transaction. In an exemplary embodiment, the tracking program is used to ensure the timely release of deeds of trust by lenders after the sale of a piece of real estate. System programs 200, specifically the search management program, receives automatic updates when the site that stores the real estate transaction information is an automated storage site where the information is stored electronically. Such site locations (addresses) can be programmed into the search management program with an appropriate interfacing protocol and the present system can automatically request, or poll, these electronic storage sites for real estate transaction information on a regular basis. The search management program can also receive information that is manually entered by a searcher 120. In operation, searcher 120 goes to storage sites, such as county court houses, that are not automated and conducts hand searches of real estate transaction information. Armed with specific transactions to research, searcher 120 checks to see if relevant deeds have been released by lenders, for example. If so, the searcher notes the date of release and at some later time accesses the search management program via the Internet 205 and enters the information in the appropriate record. Whether information is provided by a computer or by a person, access to the programs 200 of the present system is preferably made over the Internet 205.

The present system can receive electronic updates, from computer 215 for example, and manual updates, from searcher 120. A key piece of information that is tracked by server 100 is the date on which the underlying evidence of debt or Note was paid by the Settlement Agent and accepted by the Lender. In all jurisdictions, the lender or lien creditor holding a paid off lien in a real estate transaction is given a specific amount of time after the settlement date to release the lien to the property. When the lien is released, the title of the real property is "clear" and allows the new lender in the transaction to hold a priority position.

The tracking program tracks the statutory time period for each jurisdiction where the property is situate. If a Settlement Agent enters information that they received a fully executed lien release instrument and intends to record the instrument, or if they receive a copy of a recorded lien release instrument and enter the recording information on the lien release, the record is flagged by the tracking program, appropriate notices are sent, and the record is achieved. If there is no intermediate information entered concerning the lien record between the time of payoff disbursement and the expiration of the statutory period, then upon expiration of the statutory period, the record is flagged to be included in the search queue. Those records with the status of being ripe for search are allocated by the search management program—the record is automatically assigned to searchers that are members of the system, to be searched at the respective court house. If the jurisdiction has an electronic indexing system, the system automatically searches the index for a record of a release or re-conveyance of the subject lien.

The search management program tracks searcher's response time, accuracy of searches etc. If the searcher has not responded during a specified time the system automatically notifies the searcher through email, fax or other predetermined method that the record has been assigned to another searcher, or requests an explanation as to the delay. A search management program can be assisted by an administrator, or quality assurance personnel, that will monitor the proper and timely entry of the search results. System administrators are preferably on the same local area network as the present tracking system and thus are not shown in FIG. 2.

Figure 3:
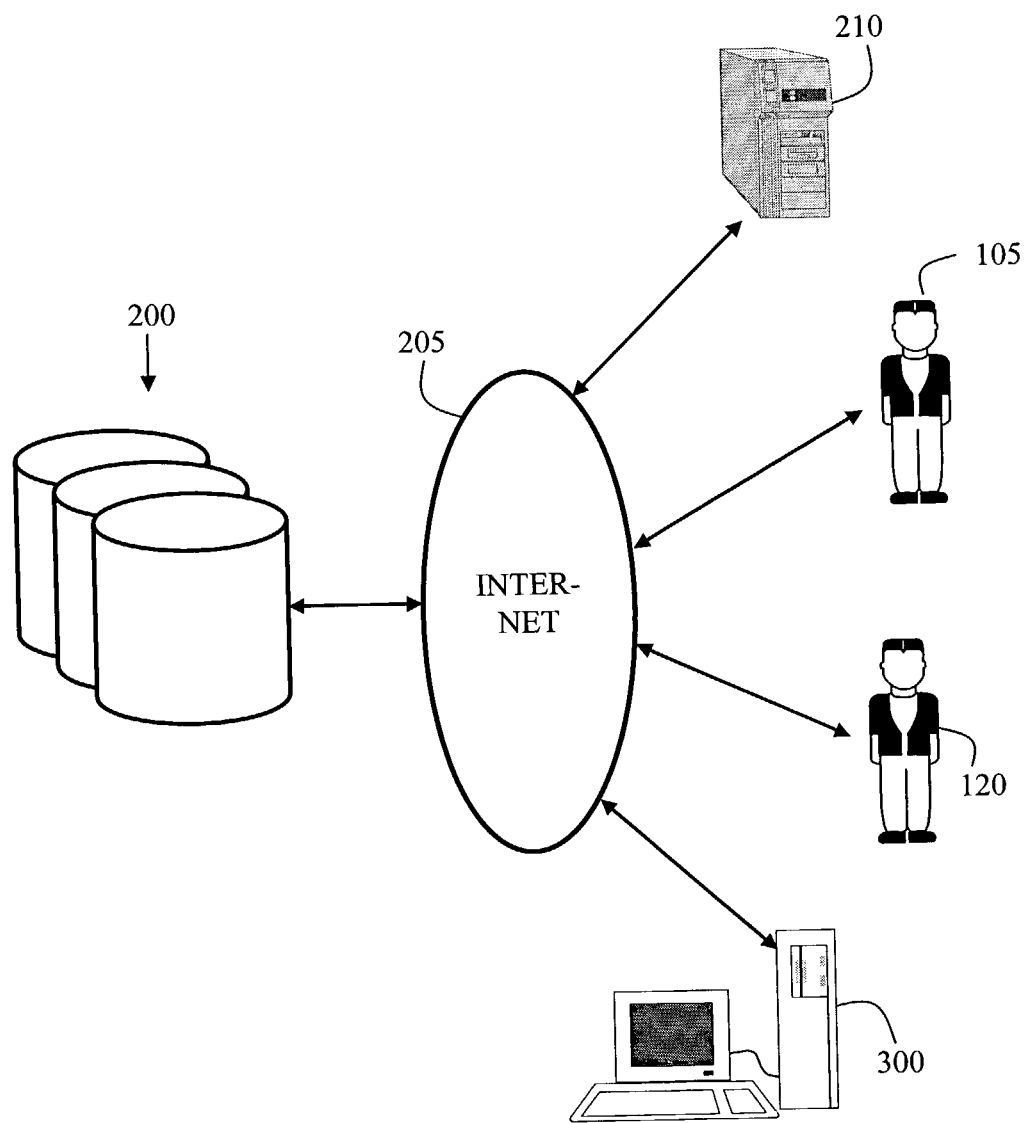
FIG. 3 shows exemplary communication channel for sending information from the present system.

Referring the FIG. 3, when the programs 200 of the present system send information to an individual, such as agent 105 or searcher 120, or to a remote computer, such as a subscriber's computer 210 or an attorney's computer 300, the information is preferably transmitted over the Internet 205. Through use of the Internet, the present system can send real estate information and related forms to personnel at any location with Internet access. Further, by being accessible via the Internet, the programs 200 can be accessed by personnel and computers at any location with Internet access. Programs 200 include composite reporting templates composed of sequences of legal phrases and statements. The programs 200 also include statutory obligations for multiple jurisdictions regarding the handling of releases of deeds of trust and other encumbrances. When tracking records, the programs 200 preferably use the statutory time period set by the state in which the property is located to test whether or not the statutory time period has passed. Each record within the database may be assigned an unlimited number of attributes. Programs 200 further implement an information mapping system that allows flexibility in information packaging and adaptive interfacing with legacy systems.

After the record is updated with the search results, and the lien is not released within the specified time, then the a forms program will create a series of demand letters addressed to the paid off lender demanding that the lien be released. If the lien was released within the statutory period, the relevant information concerning the index location of the public record, the time of the search and the date of the recording of the release are updated. The record is then marked for archival after the release information is reported to the Settlement Agent.

The legal forms program includes legal form masks, also called templates, for multiple jurisdictions that are used generate the legal forms, including release instruments, and demand letters. All jurisdictions further impose a fine on lenders or lien creditors that do not release the lien, within a specified amount of time, after receipt of the payoff funds and notice of full payment or demand. The tracking program continues to track the record after a demand letter is sent. If the deed is not released within the specified amount of time, then the legal forms program is notified and prepares the proper legal forms required to take action against the delinquent lender. The system then transmits the legal forms to a system administrator for subsequent transmission to a law firm in the seller's jurisdiction, for filing in the appropriate court of law. Of course, with pre-arrangement, the system can also send the legal forms directly to a law firm.

Figure 4:
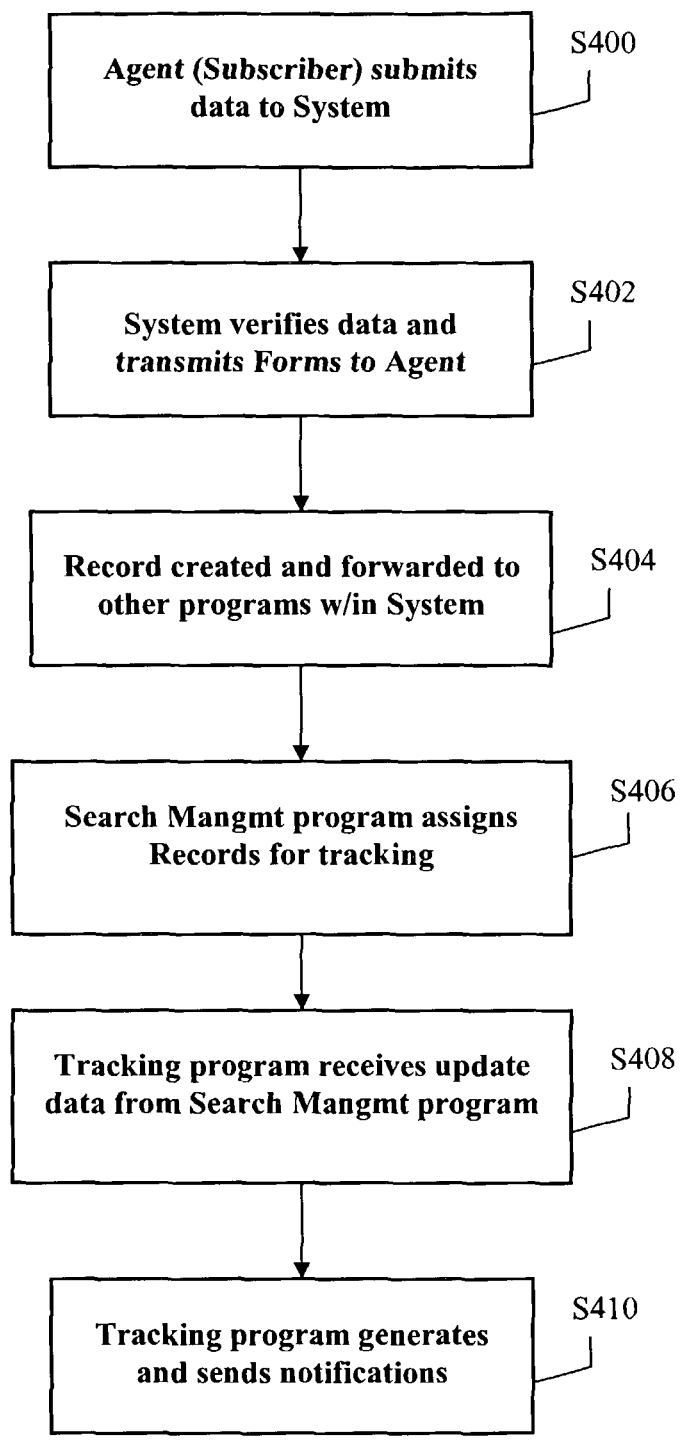
FIG. 4 is a general flow chart showing steps involved in the preferred embodiment.

FIG. 4 shows the general operation of the present system. In step S400 an agent subscribes to the present tracking system by providing some financial data to the present system, thus the agent may also be referred to as a subscriber. Also in step S400 the agent enters transaction data into the system that is used to create a subscriber's profile for the agent. In step S402, the system verifies the financial data and upon verification, the system uses the subscriber's profile to generate and transmit forms and documents for use by the agent. The forms and documents are customized for the agent and transmitted so that the agent can print the forms locally. The forms and documents relate to the transaction that was entered in the system and are customized to the jurisdiction in which the agent works. The present system can also provide unofficial documents to the agent such as fax cover letters and shipping labels. In step S404, a transaction record is created that includes the transaction data entered by the agent. Each transaction record includes at least one lien record representing an entity that is to be paid off upon the close of the transaction. If there is more than one entity to be paid off then there will be more than one lien record that is tracked. The system then, in step S404, forwards the transaction record containing the transaction data to other programs in the system. In step S406, the search management program receives the record and assigns the record for tracking. If the record can be tracked electronically, the search management program initiates electronic tracking and forwards the record to the tracking program. If the record must be tracked by manual searching, then the record is assigned to a searcher and the record is forwarded to the tracking program. In step 408, the tracking program receives update data from the search management program and uses the update data in tests to determine if notifications should be generated. Update data is provided either from a searcher or from another computer. The present system keeps track of many pieces of information however one of the more important pieces of information is whether or not the encumbrance, deed of trust for example, has been released within a specified or statutory period after the settlement date of the real estate transaction (transaction record). In step S410, the tracking program tests to see if the encumbrance has been released for a specific record. If the encumbrance was released within the statutory period after the settlement date, then the lien holder has done what they were obligated to do and tracking of that record can end. If, however, the encumbrance has not been released within the statutory time period then the tracking program generates and sends notifications to other programs and/or to an administrator. The statutory time period, typically ninety days, is set by the state legislature and begins to run on the disbursement date or settlement date of the transaction.

Figure 5A:
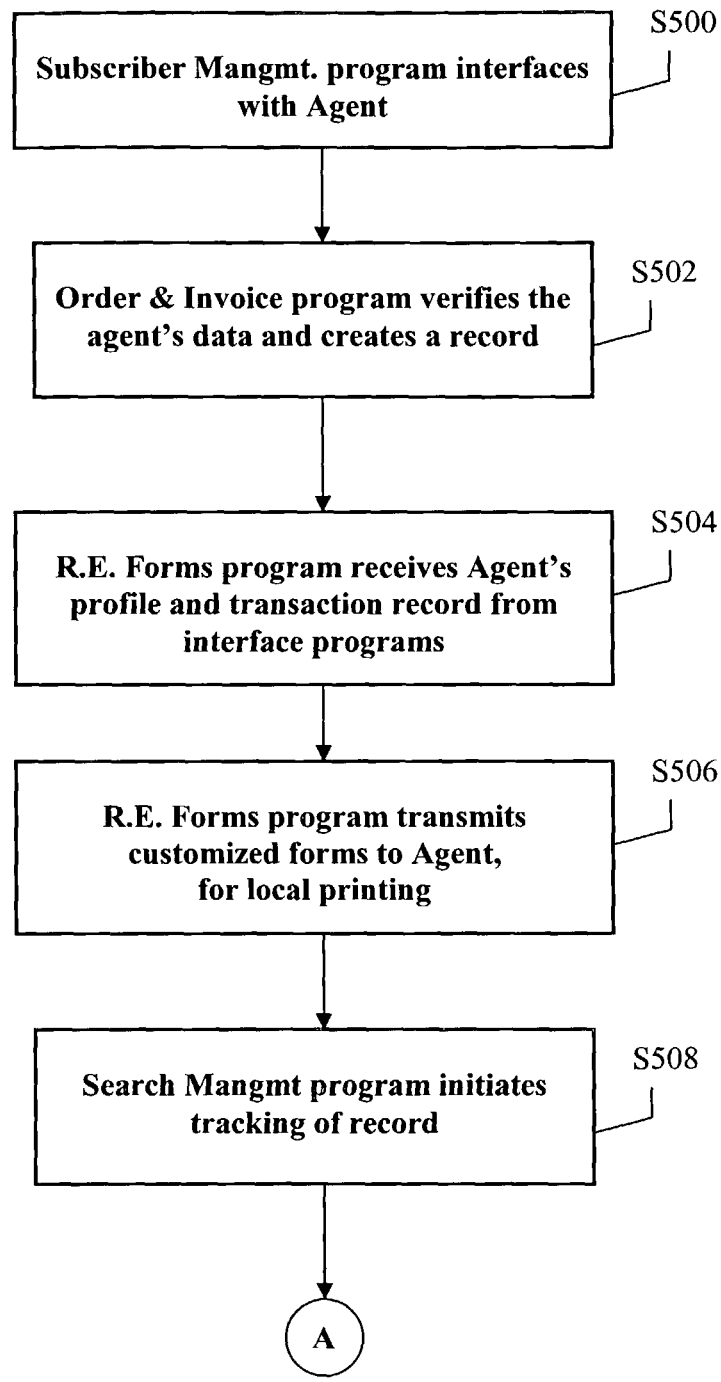
FIG. 5A is a flow chart showing exemplary steps of the preferred embodiment.
Figure 5B:
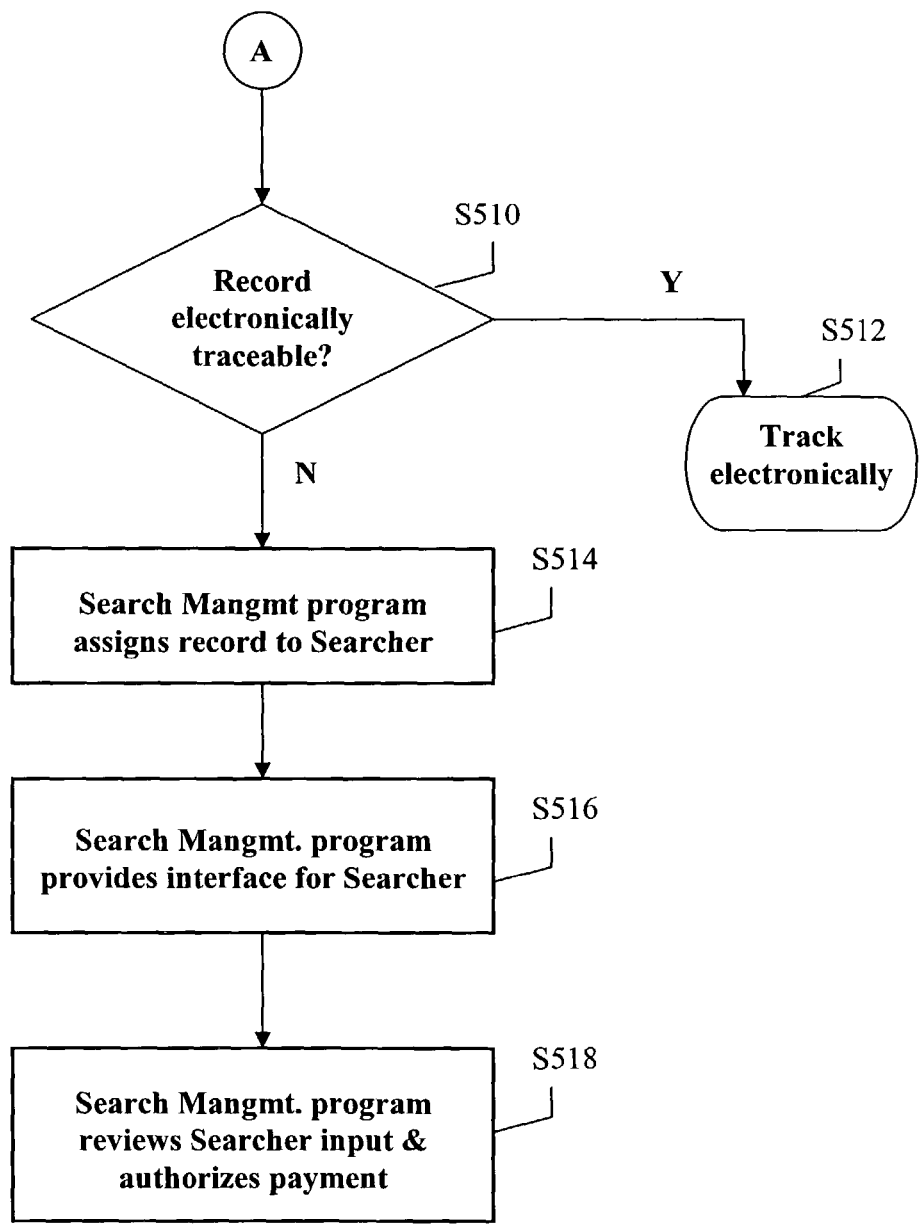
FIG. 5B is a flow chart showing further steps of the preferred embodiment; and, FIGS. 6A & 6B are flow charts showing exemplary steps of the present tracking program.

FIGS. 5A and 5B provide more detailed steps of the preferred method. Referring to FIG. 5A, in step S500, the agent accesses the present system, preferably via the Internet, and interacts with the subscriber management program, which prompts the agent for required and optional data. Based on information provided by the agent, the subscriber management program creates a subscriber profile for the agent. The subscriber profile is used by other programs in the system to, among other things, determine whether or not electronic tracking is available, and which forms and documents will be generated for the agent. In step S502, the order and invoicing program receives the agent's data and verifies the financial portion of the data. Upon verification, the order and invoicing program creates a transaction record for the entered real estate transaction and sends a signal to the real estate forms program. Each transaction record is assigned a unique identifier and preferably includes information describing the seller, buyer, lender, the real estate to be sold (or refinanced), and the settlement date. After a record has been successfully created within the system the agent is rewarded with multiple forms that the agent will require to proceed with the transaction. In step S504, the real estate forms program receives the subscriber's profile and the transaction record from the interface programs. In step 506, the real estate forms program generates customized forms and documents for the agent, based on the agent's subscriber profile and the transaction record, and transmits the forms and documents to the agent for local printing. Templates for the forms and documents are stored within the present system and information from the profile and the record are added in appropriate places automatically by the system. By taking advantage of the automatic forms preparation provided by the present system, the agent gains a substantial savings in time and avoids the risk of making clerical errors. In step 508, the search management program receives the subscriber profile and the transaction record and initiates tracking of the record. Further steps of the search management program are shown FIG. 5B.

Referring to FIG. 5B, in step S510, the search management program determines whether or not the record can be tracked electronically. If the record can be tracked electronically appropriate details, such as protocol and IP address of the storage site, are noted by the search management program and transaction record is flagged for electronic tracking, step S512. The record is then forwarded to the tracking program. If the record cannot be tracked electronically the record is assigned to a searcher, step S514. The list of available searchers is stored in the present system and the search management program assigns searchers to records based on the jurisdictions in which the searcher operates, the current work load of the searcher, and the quality of previous work done by the searcher. In step S516, the search management provides an interface for searchers to submit search results produced during their manual searches. In step S518, the search management program reviews input from the searcher for accuracy and upon approval authorizes payment of the searcher.

Figure 6A:
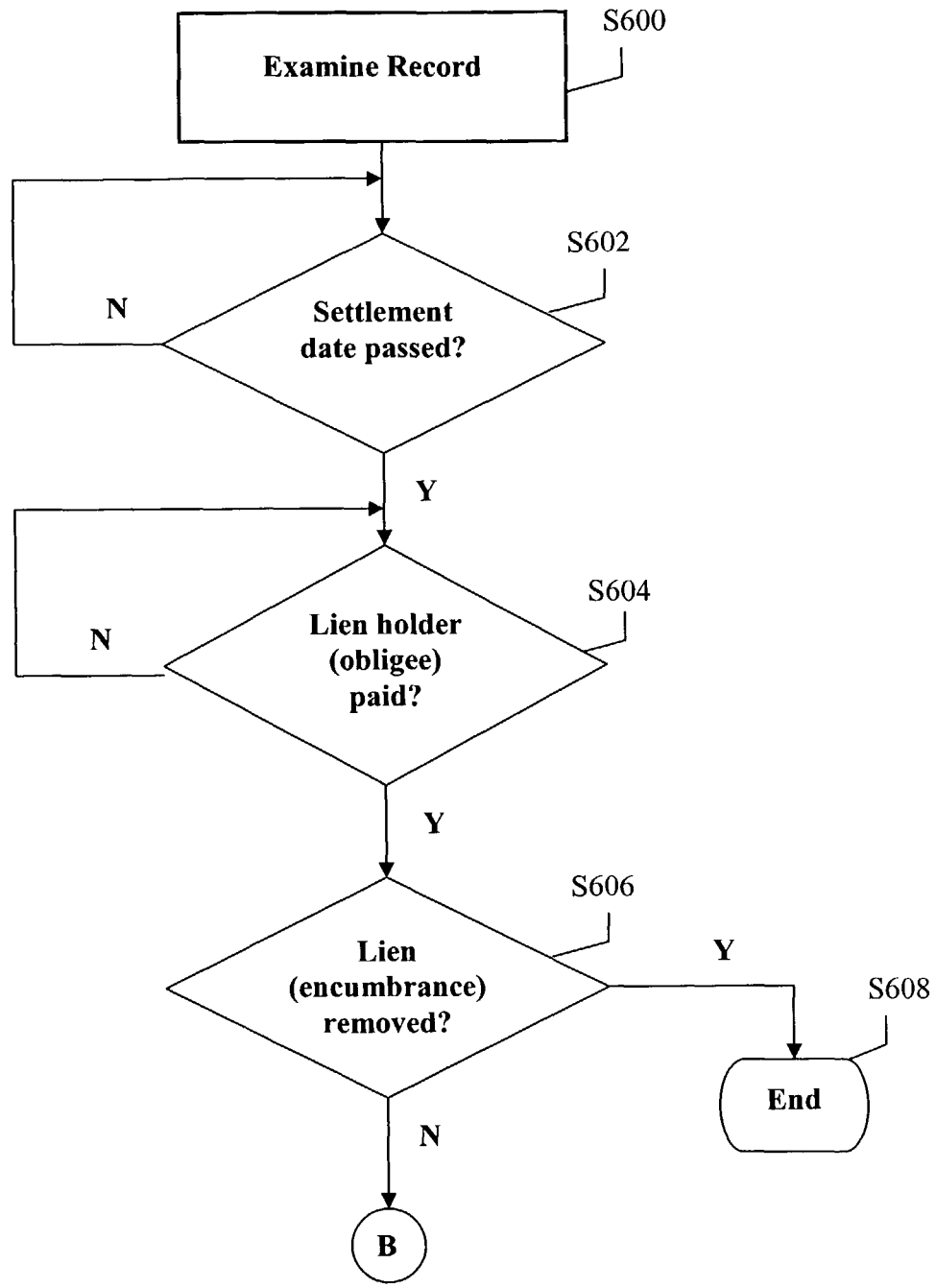
Figure 6B:
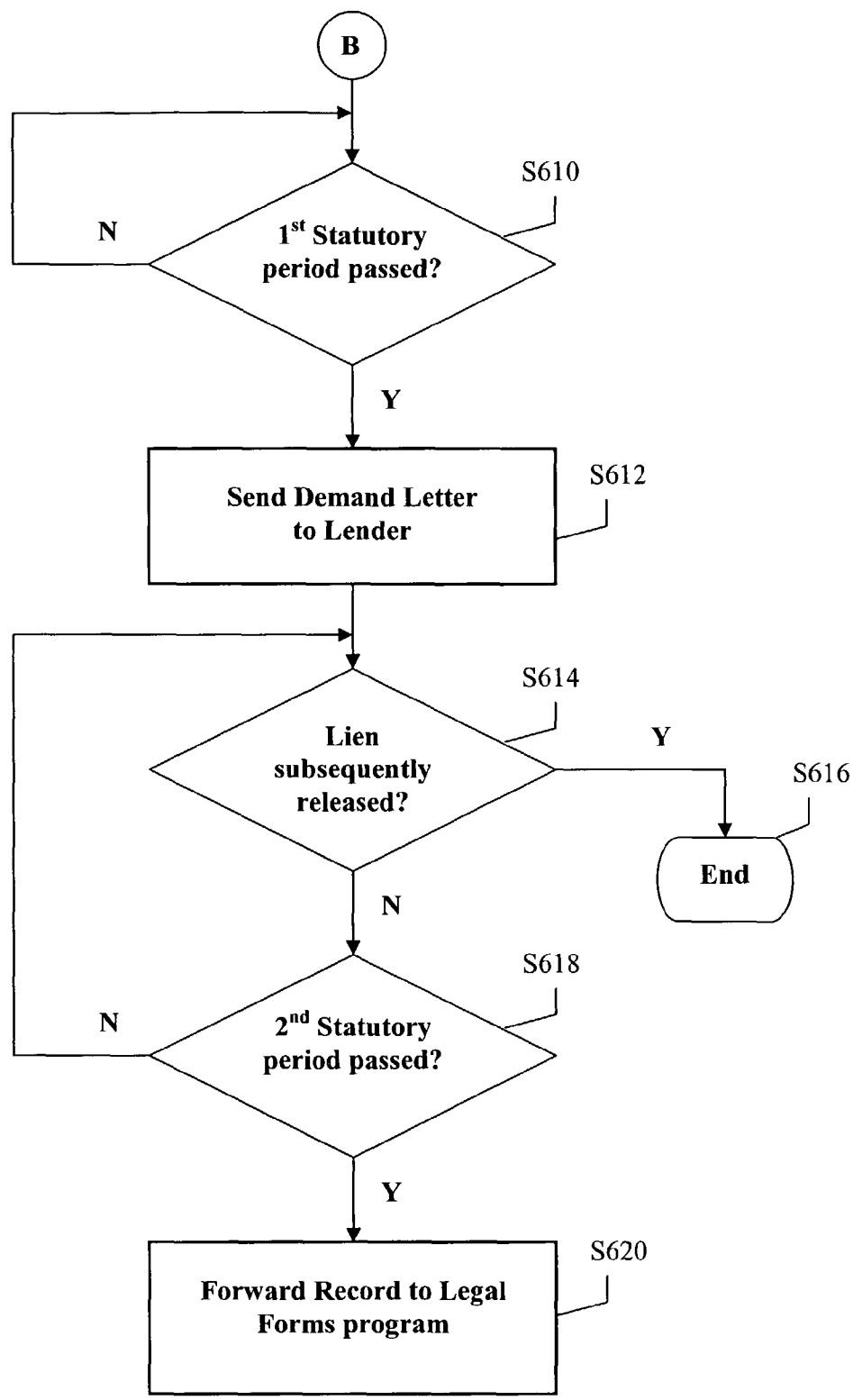

FIGS. 6A and 6B show exemplary steps of the tracking program. In step S600, the tracking program periodically, preferably at least daily, exams all transaction records. In step S602, the tracking program compares the settlement date in the record to current date to determine if the specified or statutory period following settlement date has passed. If the period has not passed then no further action is taken on the record. If however, the period has passed then the tracking program continues to step S604 where the tracking program checks to see the lien holder has been paid off. If there is more than one lien holder in the transaction record, each lien holder is checked by the tracking program. The tracking program uses update data from the search management program when performing tests on the records. The search management program receives the update information automatically (without user intervention) from other computers or via manual input from searchers. Continuing in step 604, if the lien holder has not been paid off then no action is taken, unless a predetermined time period has passed since the settlement date. This could indicate a problem, either with the lien holder receiving payment or with the quality of search data, and the tracking program will send a notification to the administrator prompting the administrator to investigate the problem. If any of the lien holders has been paid, then the tracking program moves to step S606 and checks to see if that lien (encumbrance) has been removed from the real property. If the lien has been removed then the tracking of that lien holder ends, step S608. If, however, the lien has not been removed then the tracking program moves to step S610 in FIG. 6B.

Referring to FIG. 6B, in step S610, the tracking program checks to see if the first statutory period has passed. In this example, it is assumed that the relevant state has two statutory periods pertaining to the release of liens on real estate after the lien holder has been paid. The first statute defines a time period, after the specified date or settlement date, within which the lien holder must release the lien. After the expiration of the first time period, a demand letter must be sent to the lien holder demanding release of the lien. The second statute defines a time period, after the demand letter has been sent, upon the expiration of which the lien holder can be forced to pay a fine for failing to release the lien. Of course, the present system can be adapted to conform to different statutes in different states. Continuing in FIG. 6B, if it is determined that lien holder has not released the lien after the first statutory time period, then the tracking program proceeds to step S612. In step S612, the tracking program sends a signal to a forms program, which causes a demand letter to be generated and sent to the lien holder. The demand letter includes pertinent information describing the real estate transaction and demands that the lien holder file the appropriate paperwork to cause the lien on the real estate to be removed. In step S614, the tracking program checks to see if the lien has subsequently been released. If the lien has been removed from the real estate then tracking of that lien holder ends, at step S616. If however, the system finds that the lien holder has still not released the lien then the tracking program moves to step S618. In step S618, the tracking program checks to see if the second statutory time period has passed. If the second statutory time period has not passed, the program loops back to step S614. If, however, the second statutory time period has passed then the tracking program notifies, and forwards the transaction record to, the legal forms program, step S620. The legal forms program generates legal documents that can be filed by a competent attorney with a court in the applicable jurisdiction. The legal forms indicate that the lien holder has violated a state law and provide all the information required by the relevant jurisdiction. The legal forms can be sent to an administrator or the legal forms can be sent directly to a law firm or private attorney in the appropriate jurisdiction, i.e., the jurisdiction in which the property is located.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

I claim:

1. A system for collecting information related to a real estate secured financial transaction and ensuring that each lien securing a piece of real estate that is a subject of the financial transaction is released in a timely fashion after an obligation underlying the lien has been satisfied, the system comprising:

a programmed computer;

a subscriber management program executing on the computer that receives and stores transaction data and creates a subscriber profile for an agent;

an order and invoice program executing on the computer that creates a transaction record based on the transaction data, and authorizes a release of real estate forms to the agent;

a real estate forms program executing on the computer that generates one or more real estate forms related to the real estate secured financial transaction and transmits the one or more real estate forms to the agent;

a search management program executing on the computer that assigns the transaction record for tracking and receives update information related to the record; and a tracking program executing on the computer that receives the transaction record from the search management program, determines whether the obligation underlying the lien for the transaction record has been satisfied and the lien not released within a specified time period after the obligation has been satisfied, and in such instance sends out one or more notifications.

2. The system of claim 1, wherein the transaction record includes more than one lien and the tracking program creates a lien record for each lien and tracks a status of each lien, and further wherein the specified time period is equal to a time period set by applicable state law.

3. The system of claim 1, wherein a legal forms program is also provided and the legal forms program, upon receipt of a notification from the tracking program, or a system administrator, generates one or more legal forms pertaining to the real estate secured financial transaction and transmits the legal forms to a law office or another system administrator.

4. The system of claim 1, wherein the one or more real estate forms that are provided to the agent include payoff letters, invoices, demand letters, certificates of satisfaction, release instruments, fax cover sheets, shipping labels, and transaction reports, wherein the transaction reports include, lien information, obligor information, settlement information, pay-off information and loan information.

5. The system of claim 3, wherein the legal forms program includes legal form templates for multiple jurisdictions that are used to generate the one or more legal forms, and wherein the legal forms include release instruments, demand letters, cover letters, certificates of satisfaction, complaints and summons.

6. The system of claim 3, wherein the system is accessed by searchers and other computers via the Internet, and further wherein the real estate forms and the legal forms are transmitted over the Internet.

7. The system of claim 1, wherein the transaction record includes multiple fields and multiple attributes, and a settlement date is assigned to at least one field in each record, and further wherein a specified lien holder is a lien holder that has received payment for the underlying obligation.

8. The system of claim 1, wherein the search management program includes multiple protocols and data mining programs that are used to interact with, and receive the update information from other computers, and further wherein the search management program receives search results at random times from searchers.

9. The system of claim 3, wherein the subscriber profile that is created by the subscriber management program is used by the real estate forms program and the legal forms program when generating the real estate forms and the legal forms.

10. The system of claim 1, wherein the programmed computer comprises multiple servers.

11. A method for collecting information related to a real estate secured financial transaction and ensuring that each lien is released in a timely fashion after an obligation underlying the lien has been satisfied, the method comprising the steps of:

receiving and storing, by a programmed computer transaction data via a subscriber management program that creates a subscriber profile for an agent;

creating a transaction record based on the transaction data and authorizing a release of real estate forms to the agent;

generating, by the programmed computer, one or more real estate forms related to the real estate secured financial transaction by a real estate forms program;

transmitting the one or more real estate forms to the agent;

assigning the transaction record for tracking and receiving update information by a search management program using the programmed computer;

updating the transaction record by forwarding the update information to a tracking program; and tracking, by the programmed computer, the record via a tracking program to determine whether the obligation underlying the lien has been satisfied and the lien not released within a specified time period after the obligation has been satisfied, and in such instance sending out one or more notifications.

12. The method of claim 11, wherein the transaction record includes more than one lien and the tracking program creates a lien record for each lien and tracks a status of each lien, and further wherein the specified time period is equal to a time period set by applicable state law.

13. The method of claim 11, wherein a legal forms program is provided and upon notification from the tracking program, or a system administrator, generates one or more legal forms and transmits the legal forms to a law office or another system administrator.

14. The method of claim 11, wherein the one or more real estate forms that are provided to the agent include payoff letters, invoices, demand letters, certificates of satisfaction, release instruments, fax cover sheets, shipping labels, and transaction reports, wherein the transaction reports include, lien information, obligor information, settlement information, pay-off information and loan information.

15. The method of claim 13, wherein the legal forms program includes legal form templates for multiple jurisdictions that are used to generate the one or more customized legal forms, and wherein the legal forms include release instruments, demand letters, cover letters, certificates of satisfaction, complaints and summons.

16. The method of claim 13, wherein the system is accessed by searchers and other computers via the Internet, and further wherein the real estate forms and legal forms are transmitted over the Internet.

17. The method of claim 11, wherein the transaction record includes multiple fields and multiple attributes, and a settlement date is assigned to at least one field in each record, and further wherein a specified lien holder is a lien holder that has received payment for the underlying obligation.

18. The method of claim 11, wherein the search management program includes multiple protocols and data mining programs that are used to interact with, and receive the update information from other computers, and further wherein the search management program receives search results at random times from searchers.

19. The method of claim 13, wherein the subscriber profile that is created by the subscriber management program is used by the real estate forms program and the legal forms program.

20. The method of claim 11, wherein the programmed computer comprises multiple servers.

* * * * *